UNITED STATES PATENT OFFICE 2,419,160

VEGETABLE GLUE

Gordon G. Pierson, Lansdale, Pa., assignor to Perkins Glue Company, Lansdale, Pa., a corporation of Delaware No Drawing. Application October 26, 1943, Serial No. 507,723

11 Claims. (Cl. 106—150)

The present invention relates to a novel vegetable glue base and vegetable glue, and more particularly it relates to a glue product comprising a mixture of cassava starch and wheat flour, which product possesses advantageous properties making it especially applicable for use in the wood-working trade.

Heretofore various starches have been used or proposed for use in the preparation of vegetable glues for wood-working purposes, including cassava, corn, potato, and sago starch. Such starches have been converted into glue by bursting them, with or without peroxides, copper salts, and other modifying agents, in a solution of caustic soda and water by well known and standard procedures. Starch glues for wood-working purposes must possess certain characteristics in order to be used successfully. For example, they must not carry excessive amounts of water or caustic soda and must have a relatively heavy body in order to prevent excessive penetration. Such heavy-bodied glues must, however, flow readily from containers and pipes and must maintain a reasonable degree of stability over a period of several hours. In addition, the consistency of the glue must be such that it is easily and smoothly applied from spreader rolls to veneer sheets in a smooth, continuous layer of suitable thickness.

The vegetable glues which have been sold for use in the manufacture of the better grades of plywood and furniture have generally been made from cassava starch, since that starch possesses properties, not associated with other starches, making it especially adapted for the preparation of such glues. While the properties of glues made from cassava starch have been satisfactory in general and have possessed the requisite characteristics for a satisfactory vegetable glue as above recited, cassava starch glues heretofore available have had such a tacky and rubbery consistency that very smooth spreading of the glue could not be obtained, such glues tending to form lumpy globules after application. Furthermore, glues exhibiting an excess tackiness are somewhat lacking in wetting power and for that reason have a tendency not to adhere properly to the surface being passed through the glue spreader which results in an even transfer of glue from the spreader rolls.

The principal object of the present invention is, therefore, to provide a cassava starch glue which possesses the advantageous properties of the usual glue of this type, but which is an improvement thereover since excess tackiness is reduced to a pronounced degree.

Other objects, including the provision of a vegetable glue base which is convertible into a glue of the described advantageous properties, will be apparent from this specification and the claims.

By the present invention, the improvement in the properties of the cassava-type vegetable glue results from the presence with the cassava starch of a substantial amount of wheat flour. In accordance with the invention, cassava starch and wheat flour are converted into a glue by treatment with an aqueous solution of caustic alkali in accordance with well known procedures. A glue base may be prepared by mixing the cassava starch and the wheat flour, and this base may then be converted into the glue as described.

So far as advised, wheat flour has not been previously used in the preparation of wood glues and has always been considered unsuitable for the purpose due primarily to a lack of strength and to a thick, lardy consistency, making such glues difficult to handle in mixing and spreading equipment. It was, therefore, not to be expected that a mixture of cassava starch and wheat flour would result in a glue having the advantageous properties of a cassava starch glue without its disadvantageous tackiness and other disadvantageous properties. As stated, the glue of the present invention is more easily and satisfactorily handled and spread than the usual cassava glue; and it is also greatly superior in these and other properties to a glue prepared from wheat flour alone.

The percentage of wheat flour employed with the cassava starch in the preparation of the glue of the present invention may vary over a wide range within the limits from about 25% to about 65% based on the total weight of cassava starch and wheat flour, a percentage within the range of about 35% to 50% being preferred. Any type or grade of wheat flour may be employed, but generally, the use of the type of wheat flour known as "soft" and which is a medium or low gluten wheat flour, is preferred.

In converting the mixture of cassava starch and wheat flour into the glue, the base is treated with caustic alkali and water under heat conditions causing the starch grains of the cassava starch and wheat flour to burst and to form a glue of the required consistency. The bursting of the starch granules exposes the interior as well as the exterior of the granules to reaction with the ingredients of the glue mix. Advantageously, a small amount of a peroxide may be present at the time of the conversion of the glue base into the glue, in order to improve the properties of the glue, for example, to provide a glue with a lower water ratio. The peroxide is advantageously present in amounts between about 0.1% to about 2.0% by weight based on the weight of the cassava starch and wheat flour, preferably between 0.4% to 1.0%. If the peroxide is stable in the presence of the dry cassava starch and wheat flour, it is advantageously mixed with these ingredients, and thus may become a component of the dry glue base. Barium peroxide and calcium peroxide are examples of relatively stable peroxides. If desired, the stable peroxide or an unstable peroxide, such as hydrogen peroxide and sodium peroxide, may be added at the time of the conversion of the glue base into the glue. In addition, any other modifying agents such as a copper salt may be added to the glue base or to the glue at the time of its preparation in order to improve further the consistency of the glue or to reduce its water capacity. Furthermore, other starches or flours may be present in minor proportions if desired. It is also to be understood that instead of forming a glue base, the cassava starch, the wheat flour, the caustic alkali, the water, and the peroxide or other modifying agent (if employed) may be mixed together at the time the vegetable glue is produced.

Furthermore, a small amount of a finely divided calcium compound furnishing calcium ions in the presence of water and possessing the property of liquefying and stabilizing the starches during the conversion of the material into glue and for an appreciable time thereafter may be added to the glue base or to the glue ingredients at the time of the preparation of the glue, as described and claimed in my copending application Serial No. 507,722, filed October 26, 1943, now Patent No. 2,413,885. The calcium compound employed is sufficiently soluble to provide a significant amount of calcium ions when mixed with water and possesses the property of liquefying and stabilizing starch glue. The term "liquefying" refers to the ability of the calcium compound to bring about a reduction in the viscosity or water-absorbent capacity of the glue; and the term "stabilizing" refers to the ability of the calcium compound to prevent or retard the thickening action of the glue. The calcium compound is preferably finely divided, and may be the hydroxide, peroxide, or oxide, or a salt of an organic or inorganic acid, such as the acetate, chloride, nitrate, iodide, bromide, ferrocyanide, hypochlorite, citrate, formate, lactate, and the like. It is to be understood that the compounds named are merely illustrative, and that any other calcium compound possessing the properties stated may be employed. If a calcium salt is employed, the anion of the salt is relatively unimportant so long as it does not possess a coagulating effect which would counteract the desired liquefying and stabilizing effects. Of the various calcium compounds available for use, calcium hydroxide is preferred. When a peroxide is to be employed, calcium peroxide may be used to provide all or a portion of the calcium ions and of the oxidizing action. When a calcium salt is employed, the use of a non-hygroscopic salt is recommended. If a peroxide is employed, a calcium salt will advantageously be selected which does not destroy the beneficial effects of the peroxide.

The calcium compound is present in amounts sufficient to liquefy and stabilize the starches and the amount employed is below that which will exert a thickening or coagulating effect on the starch. In general, the calcium compound is present in a small amount based on the total weight of the starch content, for example, from about 0.1% to about 1.0% calculated as $Ca(OH)_2$, about 0.3% to 0.5% being preferred. In the case of the use of a finely divided, active calcium hydrate, the amount employed will usually not exceed 0.8%. When a calcium salt is employed, the actual amount employed may, of course, be correspondingly higher, but for convenience, the figures have been given on the amount of calcium compound calculated as $Ca(OH)_2$ by weight based on the total weight of the starch content.

In preparing the glue, the cassava starch, the wheat flour, and any modifying ingredient such as the peroxide, either a preformed glue base or as separate ingredients, are placed in a glue kettle and reacted with caustic alkali and water. The caustic alkali is advantageously caustic soda but caustic potash may be employed if desired. The temperature and time of treatment may be varied as desired, but satisfactory results may be obtained by heating the mixture in the glue kettle to a temperature of about 140° F. to 170° F. for about one-half to one and one-half hours.

The amount of caustic alkali employed will be sufficient to burst the starch of the cassava starch and the wheat flour but will advantageously not be present in a large excess, for example, when the glue is to be employed in the wood-working trade, the amount of caustic alkali employed will not be sufficient to cause excessive staining of the wood glued by the product. Generally, the amount of caustic alkali employed will be between about 2% and 8%, and used not in excess of about 10%, by weight based on the weight of the cassava starch and wheat flour, the use of about 3% to 4% usually being preferred.

The ratio of water to cassava starch and wheat flour may vary as desired, depending on the particular use for which the prepared glue is intended, for example, it may be as high as 4½ to 1. In the manufacture of the better grades of plywood, the use of a relatively low water ratio is desired, and when no peroxide is employed, the ratio of water to cassava starch and wheat flour may vary between about 2 to 1 and about 3½ to 1, a water ratio of about 2¼ to 1 being preferred. When a peroxide is employed, the ratio of water, cassava starch, and wheat flour may vary between about 1.6 to 1 and about 2½ to 1, a water ratio of about 1.9 to 1 being preferred.

From the above, it will be clear that the cassava starch, the wheat flour and the water may be employed in the following parts by weight: cassava starch about 35 to about 75, wheat flour about 65 to about 25, water about 225 to about 300.

In a typical example, 215 pounds of water and 100 pounds of glue base containing 50 pounds of cassava starch and 50 pounds of wheat flour, or the individual ingredients, are added to a mixing kettle and the mass is agitated until a uniform suspension is formed. About 4 pounds of caustic soda dissolved in about 10 pounds of water are then added gradually to the mixing kettle with continued agitation. The heat is then applied to the mixing kettle and the heating continued with agitation until the mass in the kettle reaches about 140–150° F. which usually requires about one-half to one and one-half hours. During this treatment, the cassava starch and wheat flour burst. The heating is then discontinued and the mass in the kettle is cooled and agitated until approximately room temperature is reached, during which time the reaction continues. The total time for the operation varies from about one and one-half to three and one-half hours.

Considerable modification is possible in the amounts of the various components of the glue within the ranges stated as well as in the methods of preparing the same, without departing from the essential features of the invention.

I claim:

1. A vegetable glue comprising the products of reaction of cassava starch, wheat flour, caustic alkali, and water, the wheat flour being present in a percentage of from about 25% to about 65% based on the total weight of cassava starch and wheat flour, and the water being present in an amount to provide a ratio of water to starch of from about 2 to 1 to about 3½ to 1.

2. The product of claim 1 wherein the wheat flour is present in an amount between about 35% and 50% based on the total weight of cassava starch and wheat flour.

3. The product of claim 1 wherein the caustic alkali is between about 2% and about 10% based on the weight of the cassava starch and wheat flour.

4. The product of claim 1 wherein the wheat flour is present in an amount between about 35% and about 50% based on the total weight of cassava starch and wheat flour, and wherein the caustic alkali is caustic soda and is between about 2% and about 8% based on the weight of the cassava starch and wheat flour.

5. A vegetable glue comprising the products of reaction of cassava starch, wheat flour, a peroxide, caustic alkali, and water, the wheat flour being present in a percentage of from about 25% to about 65% based on the total weight of cassava starch and wheat flour, and the water being present in an amount to provide a ratio of water to starch of from about 1.6 to 1 to about 2½ to 1.

6. The product of claim 5 wherein the wheat flour is present in an amount between about 35% and 50% based on the total weight of cassava starch and wheat flour.

7. A liquefied and stabilized vegetable glue comprising the products of reaction of cassava starch, wheat flour, a calcium compound furnishing calcium ions possessing the property of liquefying and stabilizing the glue in an amount between about 0.1% and about 1.0% calculated as calcium hydrate and based on the weight of the starch, caustic alkali in an amount to burst the starch, and water, the wheat flour being present in a percentage of from about 25% to about 65% based on the total weight of cassava starch and wheat flour and the water being present in an amount to provide a ratio of water to starch of from about 2 to 1 to about 3½ to 1, the said products of reaction being substantially free from materials possessing a coagulating and thickening action on said glue.

8. A liquefied and stabilized vegetable glue comprising the products of reaction of cassava starch, wheat flour, a peroxide substantially stable in the presence of said starch and flour, a calcium compound furnishing calcium ions possessing the property of liquefying and stabilizing the glue in an amount between about 0.1% and about 1.0% calculated as calcium hydrate and based on the weight of the starch, caustic alkali in an amount to burst the starch, and water, the wheat flour being present in a percentage of from about 25% to about 65% based on the total weight of cassava starch and wheat flour and the water being present in an amount to provide a ratio of water to starch of from about 1.6 to 1 to about 2½ to 1, the said products of reaction being substantially free from materials possessing a coagulating and thickening action on said glue.

9. The product of claim 5 wherein the wheat flour is present in an amount between about 35% and 50% based on the total weight of cassava starch and wheat flour and wherein the caustic alkali is caustic soda and is present in an amount between about 2% and about 10% based on the weight of the cassava starch and wheat flour.

10. The product of claim 7 wherein the calcium compound is finely divided calcium hydroxide and wherein the caustic alkali is caustic soda.

11. The product of claim 8 wherein the calcium compound is finely divided calcium hydroxide and wherein the caustic alkali is caustic soda.

GORDON G. PIERSON.

REFERENCES CITED

The following references are of record in the file of this patent:

UNITED STATES PATENTS

| Number | Name | Date |
| --- | --- | --- |
| 2,372,666 | Fenn | Apr. 3, 1945 |
| 1,357,310 | Bloede | Nov. 2, 1920 |
| 2,275,845 | Drake | Mar. 10, 1942 |
| 1,851,955 | Dike | Mar. 29, 1932 |
| 2,153,445 | Willaman et al. | Apr. 4, 1939 |
| 2,102,937 | Bauer | Dec. 21, 1937 |
| 2,023,973 | Pierson | Dec. 10, 1935 |
| 1,904,619 | Caeser | Apr. 18, 1933 |
| 1,446,104 | Raven | Feb. 20, 1923 |
| 793,600 | Moller-Holtkamp | June 27, 1905 |
| 703,341 | Glass | June 24, 1902 |
| 579,827 | Higgins | Mar. 30, 1897 |
| 376,445 | Marsden | Jan. 17, 1888 |